(12) United States Patent
Braun et al.

(10) Patent No.: US 10,713,785 B2
(45) Date of Patent: Jul. 14, 2020

(54) IMAGE QUALITY ASSESSMENT SYSTEM AND METHOD

(71) Applicant: Siemens Healthcare GmbH, Erlangen (DE)

(72) Inventors: Sandro Braun, West Windsor, NJ (US); Xiaoguang Lu, West Windsor, NJ (US); Boris Mailhe, Plainsboro, NJ (US); Benjamin L. Odry, West New York, NJ (US); Xiao Chen, Princeton, NJ (US); Mariappan S. Nadar, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 161 days.

(21) Appl. No.: 15/892,746

(22) Filed: Feb. 9, 2018

(65) Prior Publication Data

US 2018/0232878 A1 Aug. 16, 2018

Related U.S. Application Data

(60) Provisional application No. 62/458,258, filed on Feb. 13, 2017, provisional application No. 62/579,282, filed on Oct. 31, 2017.

(51) Int. Cl.
| | |
|---|---|
| *G06T 7/00* | (2017.01) |
| *G06T 7/20* | (2017.01) |
| *G06T 7/194* | (2017.01) |

(52) U.S. Cl.
CPC .......... *G06T 7/0012* (2013.01); *G06T 7/0002* (2013.01); *G06T 7/194* (2017.01); *G06T 7/20* (2013.01); *G06T 2207/10088* (2013.01); *G06T 2207/20081* (2013.01); *G06T 2207/20084* (2013.01); *G06T 2207/30016* (2013.01); *G06T 2207/30168* (2013.01)

(58) Field of Classification Search
CPC ......... G06T 7/0012; G06T 7/194; G06T 7/20; G06T 2207/10088; G06T 2207/20081; G06T 2207/30016
See application file for complete search history.

(56) References Cited

U.S. PATENT DOCUMENTS

| 10,339,273 B2 * | 7/2019 | Schulhauser | |
| 2014/0079305 A1 * | 3/2014 | Akcakaya | G06T 7/0012 382/131 |

(Continued)

OTHER PUBLICATIONS

Koller, C. J., et al. "A survey of MRI quality assurance programmes." The British journal of radiology 79.943 (2006): 592-596.

(Continued)

*Primary Examiner* — Santiago Garcia

(57) ABSTRACT

A system and method includes generation of one or more motion-corrupted images based on each of a plurality of reference images, and training of a regression network to determine a motion score, where training of the regression network includes input of a generated motion-corrupted image to the regression network, reception of a first motion score output by the regression network in response to the input image, and determination of a loss by comparison of the first motion score to a target motion score, the target motion score calculated based on the input motion-corrupted image and a reference image based on which the motion-corrupted image was generated.

18 Claims, 8 Drawing Sheets

(56) References Cited

U.S. PATENT DOCUMENTS

| | | | | |
|---|---|---|---|---|
| 2014/0316247 | A1* | 10/2014 | Hwang | A61B 8/08 600/411 |
| 2015/0238148 | A1* | 8/2015 | Georgescu | A61B 5/7267 600/408 |
| 2015/0341548 | A1* | 11/2015 | Petrescu | H04N 5/23222 348/207.1 |
| 2016/0274209 | A1* | 9/2016 | Dannels | G01R 33/4824 |
| 2016/0328643 | A1* | 11/2016 | Liu | G06N 3/084 |
| 2018/0211164 | A1* | 7/2018 | Bazrafkan | G06N 3/088 |
| 2018/0260981 | A1* | 9/2018 | Gholipour-Baboli | G06T 11/003 |
| 2019/0035119 | A1* | 1/2019 | Cauley | G06T 7/13 |
| 2019/0051057 | A1* | 2/2019 | Sommerlade | G06T 7/337 |
| 2019/0149425 | A1* | 5/2019 | Larish | H04L 41/145 706/16 |

OTHER PUBLICATIONS

Gedamu, Elias L., D. L. Collins, and Douglas L. Arnold. "Automated quality control of brain MR images." Journal of Magnetic Resonance Imaging 28.2 (2008): 308-319.

Meding, Kristof, Alexander Loktyushin, and Michael Hirsch. "Automatic detection of motion artifacts in MR images using CNNS." Acoustics, Speech and Signal Processing (ICASSP), 2017 IEEE International Conference on. IEEE, 2017.

Heckel, Frank, et al. "Evaluation of image quality of MRI data for brain tumor surgery." Medical Imaging 2016: Image Perception, Observer Performance, and Technology Assessment. vol. 9787. International Society for Optics and Photonics, 2016.

Huang, Gao, et al. "Densely connected convolutional networks." Proceedings of the IEEE conference on computer vision and pattern recognition. vol. 1. No. 2. 2017.

Mortamet, Bénédicte, et al. "Automatic quality assessment in structural brain magnetic resonance imaging." Magnetic resonance in medicine 62.2 (2009): 365-372.

Chow, Li Sze, and Raveendran Paramesran. "Review of medical image quality assessment." Biomedical Signal Processing and Control 27 (2016): 145-154.

Tajbakhsh, Nima, et al. "Convolutional neural networks for medical image analysis: Full training or fine tuning?." IEEE transactions on medical imaging 35.5 (2016): 1299-1312.

Bosse, Sebastian, et al. "A deep neural network for image quality assessment." Image Processing (ICIP), 2016 IEEE International Conference on. IEEE, 2016.

\* cited by examiner

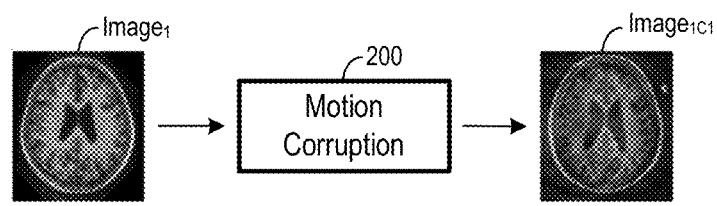
FIG. 2
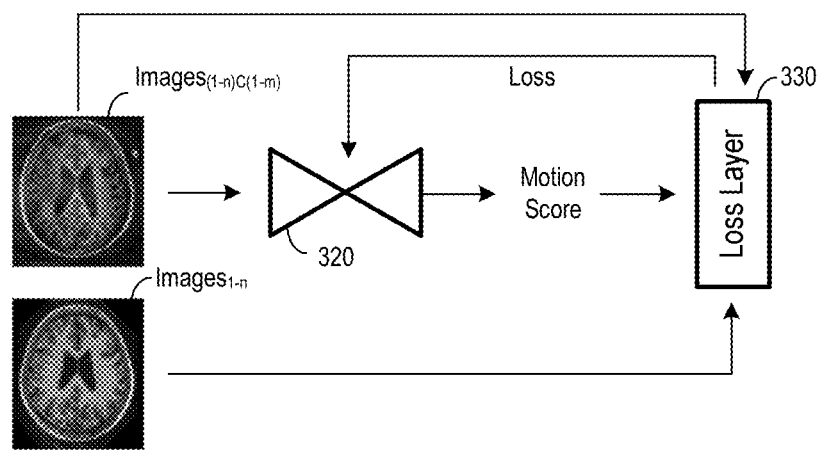
FIG. 3
FIG. 4

IMAGE QUALITY ASSESSMENT SYSTEM AND METHOD

CROSS-REFERENCE TO RELATED APPLICATIONS

The present application is related to, and claims priority to, U.S. Provisional Patent Application No. 62/579,282, filed Oct. 31, 2017, and U.S. Provisional Patent Application No. 62/458,258, filed Feb. 13, 2017, the contents of which are incorporated by reference in their entirety, for all purposes.

BACKGROUND

Images are used to evaluate, review and track physical phenomena. If an acquired image turns out to be unacceptable for its intended purpose (e.g., too blurry) it may be inefficient or impossible to re-acquire a suitable image at a later time. This issue is particularly troublesome in the case of magnetic resonance (MR) imaging, due to long image acquisition times (leading to patient movement and resulting image artifacts) and costs of re-acquisition. The inclusion of image quality assessment in an imaging pipeline may therefore improve system efficiency by ensuring sufficient quality of acquired images.

Quality assessment of medical images may assess whether image quality is acceptable or unacceptable for diagnostic purposes. Prior assessment systems have attempted to define image features which may indicate whether an image is acceptable or unacceptable. These systems have not proved suitable, at least in part to the large variety of ways in which an image may be unacceptable, and the challenge of encoding clinical knowledge relating to image quality assessment using conventional image processing techniques and metrics.

Since the determination of whether or not an image is of acceptable quality is a two-class classification task, some image quality assessment systems utilize discriminative learning models. However, these systems also have difficulty in dealing with image artifact variations, which are difficult to exhaustively define and may appear globally or locally. The number of available training samples is also limited. Moreover, these systems are unable to account for differences in image quality perception among different clinical personnel.

BRIEF DESCRIPTION OF THE DRAWINGS

FIG. 2 is a block diagram illustrating generation of motion-corrupted images according to some embodiments;

FIG. 3 is a block diagram illustrating training of a regression network to generate a motion score from an image according to some embodiments;

FIG. 4 illustrates determination of a loss term according to some embodiments;

DETAILED DESCRIPTION

The following description is provided to enable any person in the art to make and use the described embodiments and sets forth the best mode contemplated for carrying out the described embodiments. Various modifications, however, will remain apparent to those in the art.

Some embodiments provide a network and training architecture to assess image quality. Embodiments may generate motion-corrupted images from an original image, and train a regression network based on motion-corrupted images and original images to predict a metric (e.g., a motion score) for an input image. The network may therefore be trained without requiring clinically-annotated data.

In operation, the trained network receives an image and outputs a motion score. In some embodiments, the image is determined to be acceptable if the motion score exceeds a preset threshold. The trained network may implement different quality standards simply by changing the threshold.

According to some embodiments, a generative network is trained based on acceptable images to model the feature distribution of an acceptable image. A discriminative model is trained on residuals of acceptable images and unacceptable images output by the trained generative network. These residuals may be particularly suited for use with a discriminative network, since the feature distribution to which the generative network output is constrained may cause the generative network to enhance artifacts within unacceptable images.

Automated image quality assessment may improve operational efficiency and enforce image quality for clinical diagnosis. If an image is determined to exhibit unacceptable quality, an operator may adjust the protocol and reacquire the image before the patient leaves the scanner table or the exam room. Automated image quality assessment may also provide a confidence metric for subsequent post-processing, or a gating mechanism to control the workflow (e.g., whether or not to proceed with post-processing).

Figure 1:
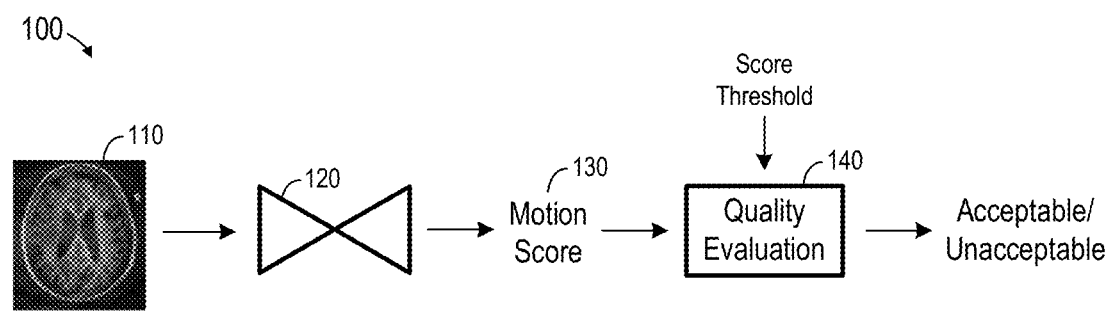
FIG. 1 is a block diagram of a system to assess image quality according to some embodiments.

FIG. 1 depicts operation of network architecture 100 according to some embodiments. Regression network 120 receives image 110 and outputs motion score 130. According to some embodiments, motion score 130 indicates a degree to which image 110 is corrupted by relative motion between the imaged object and the system used to obtain image 110.

Quality evaluation component 140 compares motion score 130 against a score threshold and outputs a result. According to some embodiments, quality evaluation component 140 outputs an "Acceptable" indicator if the motion score is less than the score threshold and an "Unacceptable" indicator if the motion score is greater than or equal to the score threshold. The motion score may be inversely proportional to a degree of motion corruption, in which case quality evaluation component 140 may output an "Acceptable" indicator if the motion score is greater than the score threshold and an "Unacceptable" indicator if the motion score is less than or equal to the score threshold. Some embodiments may employ multiple thresholds, using which using which quality evaluation component 140 may determine and output more fine-grained indicators of image quality (e.g., 1-5).

In some embodiments, network 120 may output more than one type of motion score. Quality evaluation component 140 may evaluate these scores (e.g., by comparing the scores against score thresholds corresponding to each type of motion score) and output an Acceptable or Unacceptable indicator based on the comparison.

Network 120, quality evaluation component 140, and each functional component described herein may be implemented in computer hardware, in program code and/or in one or more computing systems executing such program code as is known in the art. Such a computing system may include one or more processing units which execute processor-executable program code stored in a memory system. Network 120 may comprise hardware and software specifically-intended for configuring, implementing and training neural networks. Network 120 may also comprise hardware and software to implement algorithms learned on such specifically-intended hardware and software via training as described below.

Network 120 may comprise any type of learning network that is or becomes known, including but not limited to a convolutional neural network. As mentioned above, network 120 may be trained based on images and on images which have been motion-corrupted based on the original images. Such training reduces a need for obtaining training images which are known to be corrupted.

FIG. 2 illustrates generation of training images according to some embodiments. Generally, motion corruption component 200 receives image $Image_1$ and generates motion-corrupted image $Image_{1C1}$ based thereon. Motion corruption component 200 may generate several different motion-corrupted images (e.g., images $Image_{1C2}$, $Image_{1C2}$, ..., $Image_{1Cn}$) based on $Image_1$ and may also generate one or more motion-corrupted images for each of many other original images $Image_2$, $Image_3$, ..., $Image_m$.

$Image_1$ is depicted as a brain MR slice image, but embodiments are not limited to any particular imaging modality or dimensionality. Embodiments may prove useful in the case of MR images because MR imaging requires relatively long acquisition times and is especially prone to motion artifacts. According to some embodiments, original images $Image_2$, $Image_3$, ..., $Image_m$ may include only T1-weighted images, only T2-weighted images, or both T1-weighted and T2-weighted images.

Motion corruption component 200 may modify the input image to simulate the effect of various motion types (e.g., rotation, translation) and degrees of motion severity during the acquisition of the input image. In the case of a projection image (e.g., X-ray) or camera-acquired image, this modification may include modifying the input image to exhibit blur, object rotation, object translation, and/or any other suitable effects.

On the other hand, raw MR data consists of transversal components of magnetization in an imaged object after excitation, sampled from a receiver coil signal and stored as a function of time during the data acquisition portion of an MR imaging sequence. In a transverse slice, the horizontal axis is usually set as the frequency-encoding direction, while the vertical axis is the phase-encoding direction of excited protons. The raw data are also known as k-space data, where k-space represents the spatial frequency information in two or three dimensions of the imaged object. The k-space is defined as the space covered by the phase and frequency encoding data.

Due to these characteristics of raw MR data, motion of an object during imaging causes a Fourier shift in the k-space data. The motion results in different phase shifts for different measurements taken at different times. Accordingly, motion corruption component 200 may receive known acceptable image $Image_1$, convert image $Image_1$ to raw k-space data (e.g., via an inverse Fourier transform), introduce the desired motion in the k-space data through phase-shifting the k-space data, and reconstruct image $Image_{1C1}$ (e.g., via a Fourier transform. In some embodiments, motion corruption component 200 may receive raw (i.e., pre-reconstruction) k-space data, eliminating the need to convert a reconstructed image to k-space data.

According to some embodiments, motion corruption component 200 simulates a motion trajectory of an object through time, which represents a motion to be introduced into $Image_1$. The motion trajectory is sampled at the time the measurement is acquired, thereby providing a phase shift to be applied to measurements acquired at that time. The phase-shifted measurements are collected and a now motion-corrupted image $Image_{1C1}$ is reconstructed via a Fourier transform as is known in the art. Additional motion-corrupted images $Image_{1C(2-n)}$ may be generated based on $Image_1$ by using different motion trajectories representing different motions.

FIG. 3 illustrates training of a regression network 320 according to some embodiments. Regression network 320 is designed to receive an image and output a motion score. Regression network 320 is trained as is known in the art to regress to a score indicative of a degree of motion present in the received image.

As is known in the art, training of network 320 involves determining a loss based on the output of network 320 and iteratively modifying network 320 based on the loss until the loss reaches an acceptable level or training otherwise terminates. In some embodiments, network 320 receives images $Images_{(1-n)C(1-m)}$ which were generated by motion corruption component 200 based on $Images_{(1-n)}$ and determines motion scores for each received image. Loss layer component 330 determines a loss by comparing the motion scores to "ground truth" motion scores. In the illustrated embodiment, the ground truth motion scores are calculated based on each image of $Images_{(1-n)C(1-m)}$ and its corresponding image of $Images_{(1-n)}$.

FIG. 4 illustrates aspects of a loss calculation according to some embodiments. FIG. 4 illustrates calculation of a loss associated with the processing of motion-corrupted image $Image_{3C7}$. According to the naming convention used herein, $Image_{3C7}$ is the seventh motion-corrupted image generated based on original image $Image_3$. As shown in FIG. 4, the loss associated with the processing of $Image_{3C7}$ is equal to the difference between the motion score output by network 320 based on $Image_{3C7}$ and the $l_2$-norm of $Image_{3C7}$ normalized by the $l_2$-norm of $Image_3$. In this regard, the $l_2$-norm of $Image_{3C7}$ normalized by the $l_2$-norm of $Image_3$ is considered the ground truth motion score for $Image_{3C7}$. Some embodiments may utilize any other suitable measures of loss.

The loss which is back-propagated from loss layer component 330 to network 320 may comprise an L1 loss, and L2 loss, or any other suitable measure of total loss. An L1 loss is the sum of the absolute differences between each output motion score and its corresponding ground truth motion score, and an L2 loss, is the sum of the squared differences between each output motion score and its corresponding ground truth motion score.

As described above, network 320 may be designed to output several different types of motion scores, in which case loss layer component 330 may operate as described above with respect to each type of score.

Figure 5:
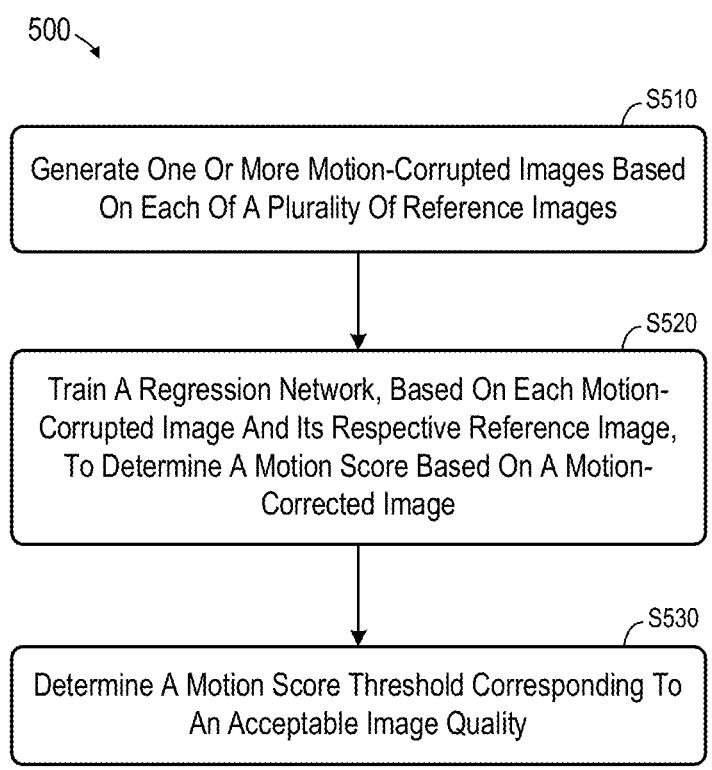
FIG. 5 is a flow diagram of a network training process according to some embodiments.

FIG. 5 is a flow diagram of process 500 according to some embodiments. Process 500 and the other processes described herein may be performed using any suitable combination of hardware, software or manual means. Software program code embodying these processes may be stored by any non-transitory tangible medium, including a fixed disk, a volatile or non-volatile random access memory, a floppy disk, a CD, a DVD, a Flash drive, or a magnetic tape. Embodiments are not limited to the examples described below.

Initially, one or more motion-corrupted images is generated based on each of a plurality of reference images. As described above, the plurality of reference images may comprise any type of two-dimensional or three-dimensional images. One or more of the plurality of reference images may comprise images known to be of acceptable image quality.

The motion-corrupted images generated based on a reference image may represent different magnitudes, directions and types of motions. Generation of the motion-corrupted images may proceed in any manner suitable to the type of the reference image. For example, image generation may proceed in the image domain in the case of projection or camera-based reference images, and in the frequency domain in the case of MR images.

Next, at S520, the generated motion-corrupted images are used to train a regression network. The regression network is trained to generate a motion score based on a motion-corrupted image. According to some embodiments, the training compares motion scores generated by the network with "ground truth" motion scores calculated based on each motion-corrupted image and its respective reference image (i.e., the reference image based on which the motion-corrupted image was generated), and iteratively modifying the network based thereon.

A motion score threshold corresponding to an acceptable image quality is then determined at S530. The threshold may be determined such that an image is deemed acceptable if it is associated (by the trained network) with a motion score above (or below, if the motion score is inversely proportion to an amount of motion in the image) the threshold. In some embodiments, a motion score may be determined by inputting each of a set of images labeled as either acceptable or unacceptable images to the trained network and determining associated motion scores. The motion score threshold is identified at S530 as a motion score which delineates the motion scores of the acceptable images from the motion scores of the unacceptable images.

The trained network and motion score threshold resulting from process 500 may be used to efficiently identify images as acceptable or unacceptable as described above with respect to FIG. 1. The motion score threshold may be personalized to particular clinical personnel by having the clinical personnel label each image of the set of images as either acceptable or unacceptable. In a case that the network is designed to output several different types of motion scores, an individual threshold for each type of motion score may be determined at S530.

Figure 6:
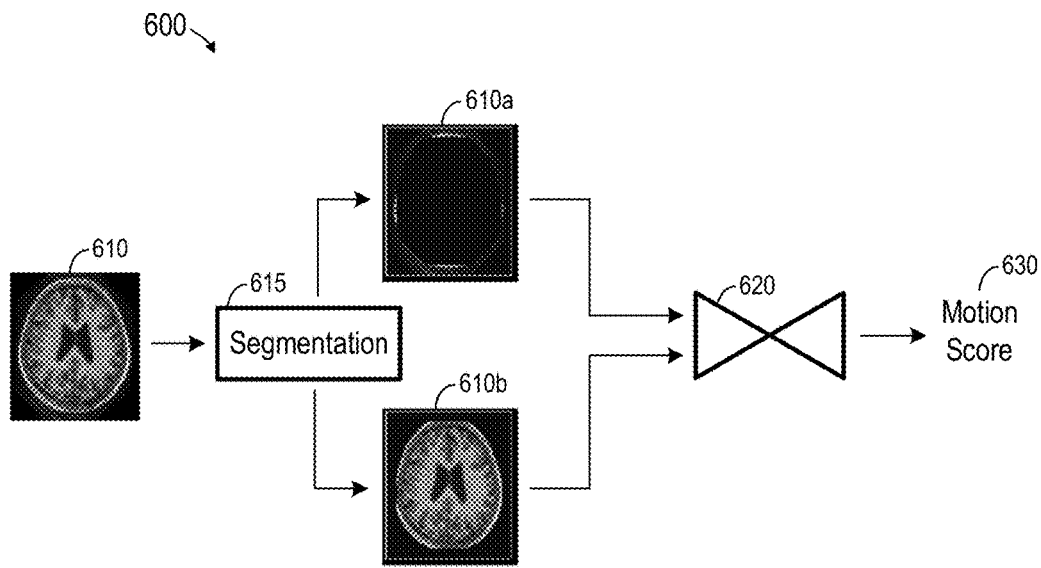
FIG. 6 is a block diagram of a system to assess image quality according to some embodiments.
Figure 7:
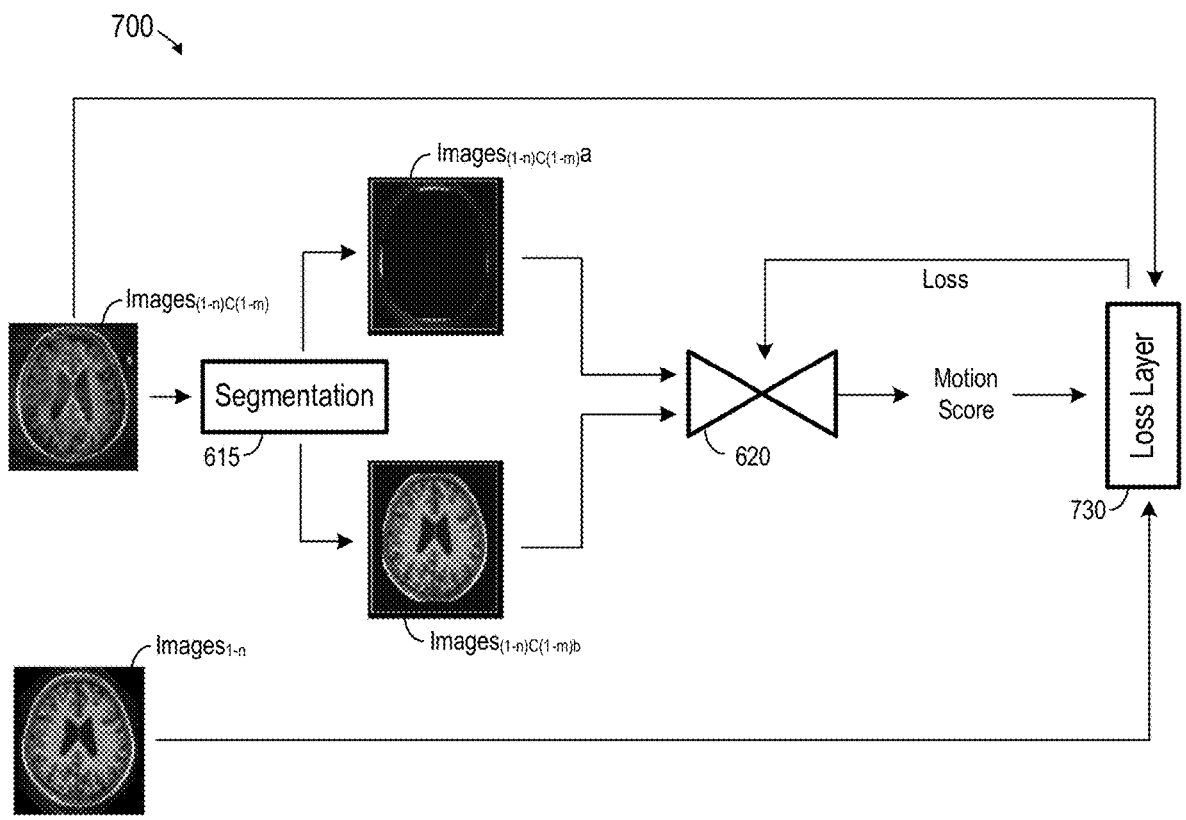
FIG. 7 is a block diagram illustrating training of a regression network to generate a motion score from segmented images according to some embodiments.

FIG. 6 illustrates architecture 600, in which image 610 is segmented by segmentation component 615 prior to input to regression network 620, and motion score 630 is determined from segmented background image 610a and segmented foreground image 610b. FIG. 7 illustrates training architecture 700 for regression network 620. Training architecture 700 may operate similarly to that described with respect to FIG. 3. In this regard, loss layer component 730 may determine the back-propagated loss based on the output motion scores, the images $Images_{(1-n)C(1-m)}$, and respective reference images $Images_{(1-n)}$ as described with respect to loss layer 330.

Figure 8:
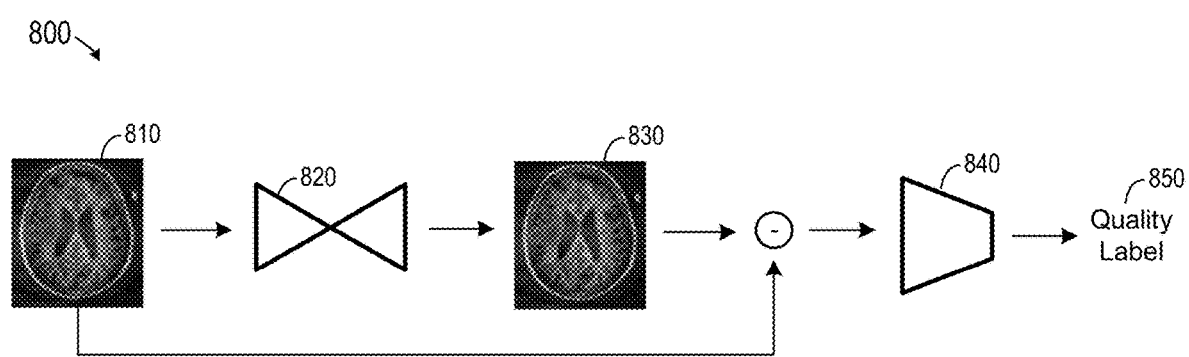
FIG. 8 is a block diagram of a system to assess image quality according to some embodiments.

Network 800 of FIG. 8 may determine a quality label based on an input image according to some embodiments. Generative network 820 may receive image 810 and generate image 830 therefrom. A difference, or residual, between image 810 and 830 is then determined and input to discriminator network 840. Discriminator network 840 then outputs quality label 850 based on the input residual. The quality label may comprise, e.g., "acceptable" or "unacceptable", and is associated with image 810. That is, such a quality label 850 indicates whether image 810 is acceptable or unacceptable, as those terms are implicitly defined by the training data.

Figure 9:
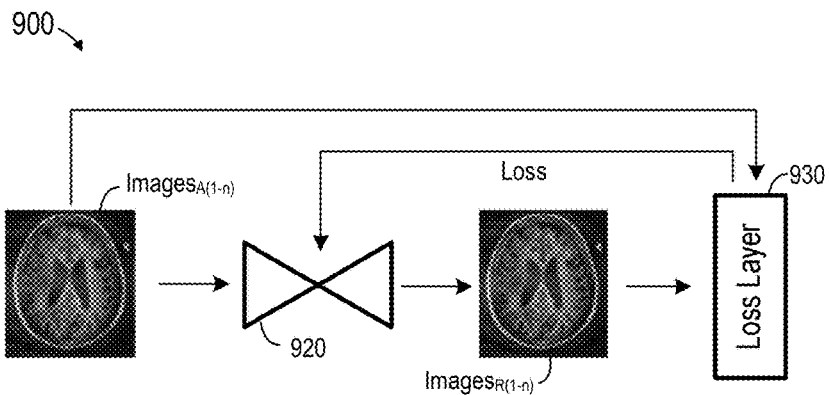
FIG. 9 is a block diagram illustrating training of a generative network to generate an acceptable image according to some embodiments.

FIG. 9 illustrates training architecture 900 for training generative network 920 according to some embodiments. Trained generative network 920 may be used as an implementation of generative network 820 of network 800 as described above. Generative network 920 may comprise an auto-encoder or convolutional encoder-decoder, but embodiments are not limited thereto.

Generative network 920 is trained using acceptable images $Images_{A(1-n)}$. $Images_{A(1-n)}$ may have been previously deemed acceptable for their intended use (e.g., general diagnosis, a particular type of diagnosis, treatment planning). Loss layer 930 determines a loss based on a total difference (e.g., L1 or L2 loss) between output images $Images_{R(1-n)}$ and respective input images $Images_{A(1-n)}$. Accordingly, since input images $Images_{A(1-n)}$ are deemed acceptable, network 920 is trained to output images which are similar to acceptable images.

In some embodiments, an encoder portion of network 920 performs hierarchical feature abstraction of the input images and a decoder portion reconstructs images based on the abstracted features. Network 920 therefore learns a feature distribution associated with the training images. Since the training images are all acceptable, the feature distribution is associated with acceptable images. In other words, the output of trained generative network 920 is constrained within the learned acceptable image feature distribution.

Figure 10:
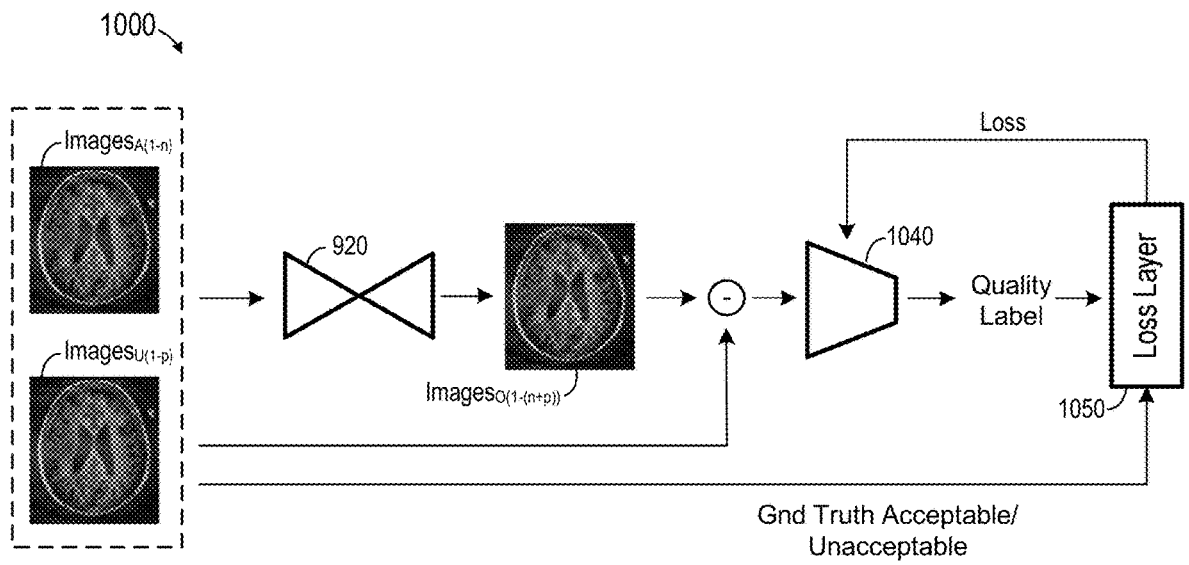
FIG. 10 is a block diagram illustrating training of a discrimination network to assess image quality according to some embodiments.

FIG. 10 illustrates architecture 1000 for training discriminative network 1040 according to some embodiments. Trained discriminative network 1040 may be used, in conjunction with trained generative network 920, as an implementation of discriminative network 840 of network 800 as described above. Discriminative network 1040 may comprise a convolutional neural net, but embodiments are not limited thereto.

Discriminative network 1040 is trained using acceptable training images $Images_{A(1-n)}$ and unacceptable training images $Images_{U(1-p)}$. Acceptable training images $Images_{A(1-n)}$ may be different from acceptable training images $Images_{A(1-n)}$ used to train generative network 920 as shown in FIG. 9. Generative network 920 generates output images $Images_{O(1-(n+p))}$ based on respective ones of acceptable training images $Images_{A(1-n)}$ and unacceptable training images $Images_{U(1-p)}$. By virtue of the foregoing, output images $Images_{O(1-(n+p))}$ are constrained to the previously-learned feature distribution of acceptable images.

A difference, or residual, is determined between each output image $Images_{O(1-(n+p))}$ and the input image from which it was generated. The residual may be determined using any suitable calculation for representing a difference between two images and is not limited to a difference image or the like.

These residuals may be particularly suited for use with a discriminative network, since the feature distribution to which the output of generative network 920 is constrained may cause generative network 920 to enhance artifacts within unacceptable images. In other words, since output images $Images_{O(1-(n+p))}$ are constrained to the previously-learned feature distribution of acceptable images, it is more likely that the residuals associated with unacceptable training image $Images_{U(1-p)}$ will be larger than the residuals associated with acceptable training image $Images_{A(1-p)}$.

Discriminator network 1040 receives each residual and determines a quality label based thereon. Loss layer 1050 compares the determined quality labels to the ground truth quality label of the input image from which the residual was generated, and calculates a loss term which is back-propagated to discriminator 1040. Discriminator 1040 is modified based on the loss as is known in the art and the process repeats until the loss is suitably minimized.

Figure 11:
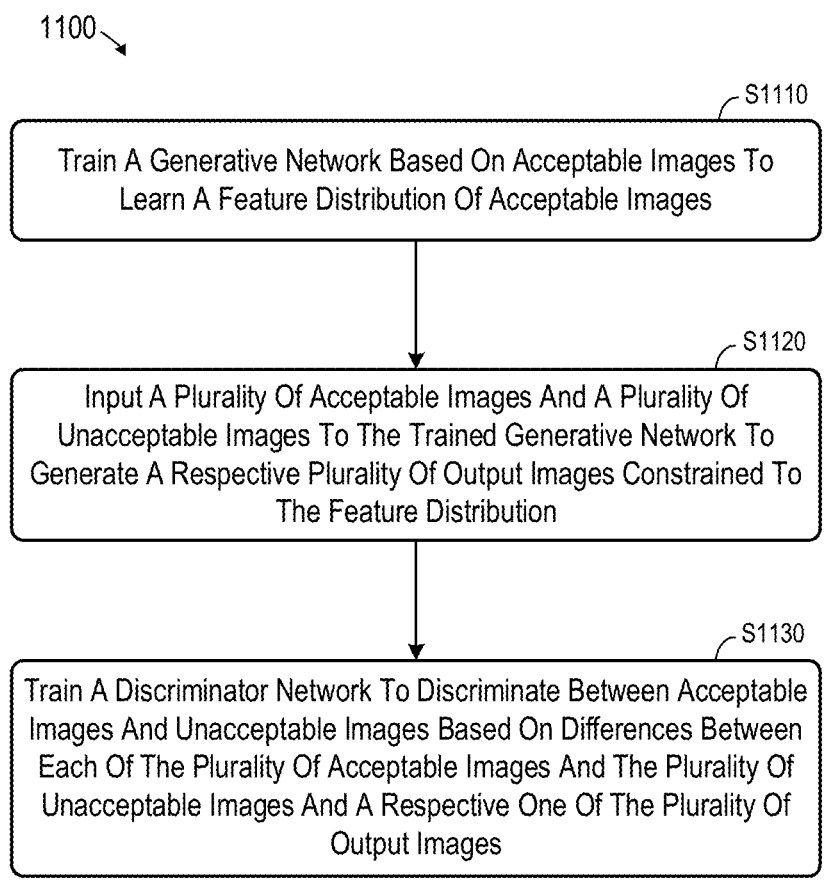
FIG. 11 is a flow diagram of a process to train a generative network and a discriminator network according to some embodiments.

FIG. 11 is a flow diagram of process 1100 to train a generative network and a discriminator network for use in a quality assessment network such as network 800 according to some embodiments. Process 1100 and the other processes described herein may be performed using any suitable combination of hardware, software or manual means. Software program code embodying these processes may be stored by any non-transitory tangible medium, including a fixed disk, a volatile or non-volatile random-access memory, a floppy disk, a CD, a DVD, a Flash drive, or a magnetic tape. Embodiments are not limited to the examples described below.

At S1110, a generative network is trained based on acceptable images. Process 1100 may be applied to images of any type and/or dimensionality, and the acceptable images may consist of any set of images which have been deemed acceptable for any intended subsequent use or processing. The generative network may be configured to encode an image and decode the encoded image to generate an output image. Network loss is determined during training by comparing the output images against the input images, the generative network is modified based on the network loss, and training continues until the overall loss is satisfactory. As described with respect to FIG. 9, training of the generative network at S1110 results in the learning of a feature distribution of acceptable images.

Next, at S1120, a plurality of acceptable training images and a plurality of unacceptable training images are input to the trained generative network. For each input image, the trained generative network generates a respective output image constrained to the feature distribution of acceptable images learned at S1110.

A discriminative network is trained at S1130 to discriminate between acceptable images and unacceptable images. Training of the discriminative network is based on differences between each of the plurality of acceptable training images and plurality of unacceptable training images and its respective output image generated by the trained generative network. In some embodiments, the differences associated with unacceptable training images will likely be larger than the differences associated with acceptable training images, because the output images are constrained to the feature distribution of acceptable images.

Figure 12:
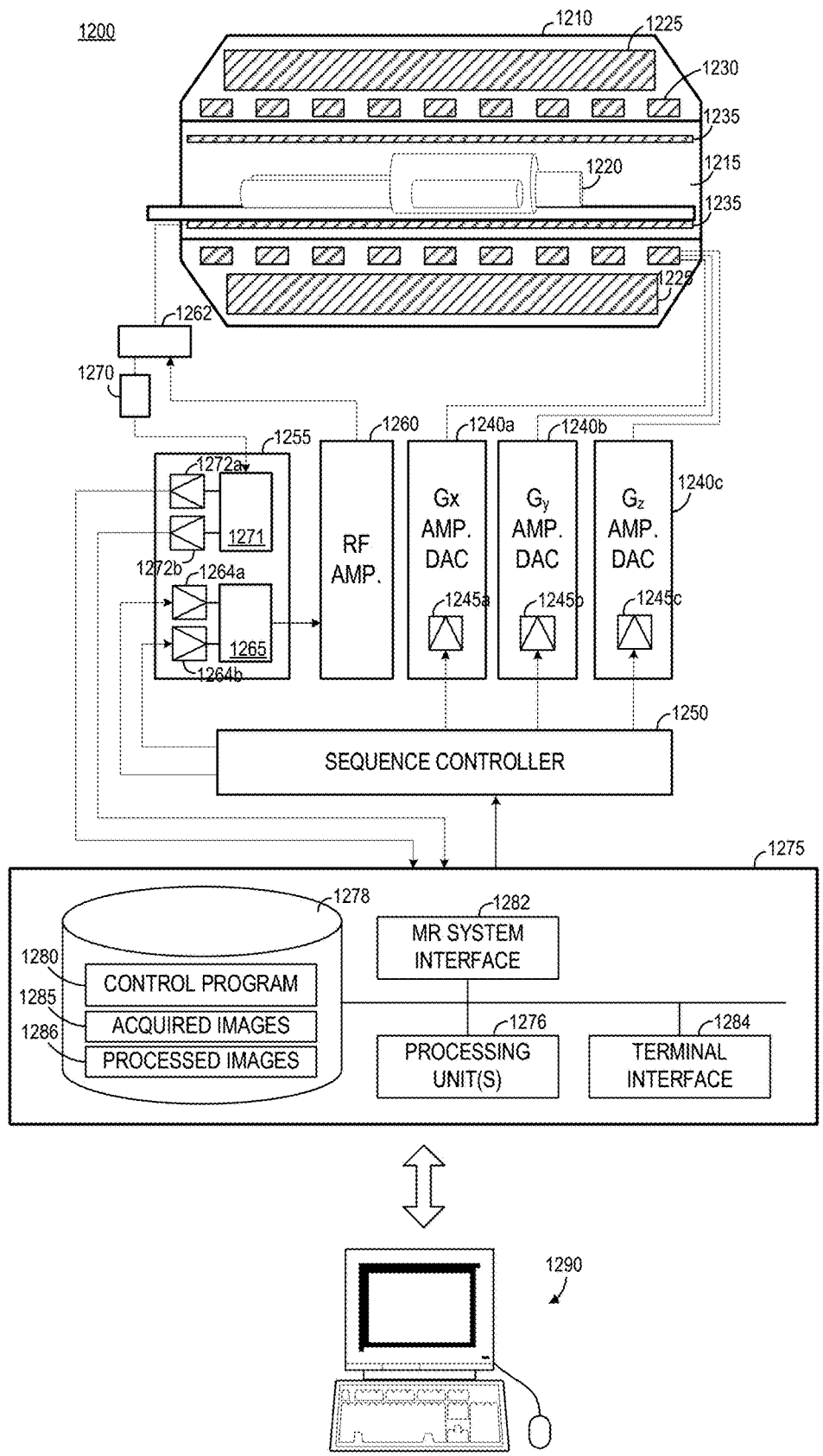
FIG. 12 illustrates an imaging system according to some embodiments.

FIG. 12 illustrates MRI system 1200 according to some embodiments. System 1200 may be operated to generate images and assess image quality according to some embodiments. Embodiments are not limited to system 1200, or to an MRI system, to perform either function.

MRI system 1200 includes MRI chassis 1210, which defines bore 1215 in which patient 1220 is disposed. MRI chassis 1210 includes polarizing main magnet 1225, gradient coils 1230 and RF coil 1235 arranged about bore 1215. According to some embodiments, polarizing main magnet 1225 generates a uniform main magnetic field ($B_0$) and RF coil 1235 emits an excitation field ($B_1$).

According to MM techniques, a substance (e.g., human tissue) is subjected to a main polarizing magnetic field (i.e., $B_0$), causing the individual magnetic moments of the nuclear spins in the substance to process about the polarizing field in random order at their characteristic Larmor frequency, in an attempt to align with the field. A net magnetic moment $M_z$ is produced in the direction of the polarizing field, and the randomly-oriented magnetic components in the perpendicular plane (the x-y plane) cancel out one another.

The substance is then subjected to an excitation field (i.e., $B_1$) created by emission of a radiofrequency (RF) pulse, which is in the x-y plane and near the Larmor frequency, causing the net aligned magnetic moment $M_z$ to rotate into the x-y plane so as to produce a net transverse magnetic moment $M_t$, which is rotating, or spinning, in the x-y plane at the Larmor frequency. The excitation field is terminated and signals are emitted by the excited spins as they return to their pre-excitation field state. The emitted signals are detected, digitized and processed to reconstruct an image using one of many well-known MRI reconstruction techniques.

An RF pulse may be emitted as a magnetization preparation step in order to enhance or suppress signals from certain tissue so as to generate desired levels of contrast in the resulting image. For example, an inversion, or saturation, pulse is used in non-contrast-enhanced angiography to suppress venous blood in order to highlight the arterial system.

Gradient coils 1230 produce magnetic field gradients $G_x$, $G_y$, and $G_z$ which are used for position-encoding NMR signals. The magnetic field gradients $G_x$, $G_y$, and $G_z$ distort the main magnetic field in a predictable way so that the Larmor frequency of nuclei within the main magnetic field varies as a function of position. Accordingly, an excitation field $B_1$ which is near a particular Larmor frequency will tip the net aligned moment $M_z$ of those nuclei located at field positions which correspond to the particular Larmor frequency, and signals will be emitted only by those nuclei after the excitation field $B_1$ is terminated.

Gradient coils 1230 may consist of three windings, for example, each of which is supplied with current by an amplifier 1240a-1240c in order to generate a linear gradient field in its respective Cartesian direction (i.e., x, y, or z). Each amplifier 1240a-1240c includes a digital-analog converter 1245a-1245c which is controlled by a sequence controller 1250 to generate desired gradient pulses at proper times.

Sequence controller 1250 also controls the generation of RF pulses by RF system 1255 and RF power amplifier 1260. RF system 1255 and RF power amplifier 1260 are responsive to a scan prescription and direction from sequence controller 1250 to produce RF pulses of the desired frequency, phase, and pulse amplitude waveform. The generated RF pulses may be applied to the whole of RF coil 1235 or to one or more local coils or coil arrays. RF coil 1235 converts the RF pulses emitted by RF power amplifier 1260, via multiplexer 1262, into a magnetic alternating field in order to excite the nuclei and align the nuclear spins of the object to be examined or the region of the object to be examined. As mentioned above, RF pulses may be emitted in a magnetization preparation step in order to enhance or suppress certain signals.

The RF pulses are represented digitally as complex numbers. Sequence controller 1250 supplies these numbers in real and imaginary parts to digital-analog converters 1264a-1264b in RF system 1255 to create corresponding analog pulse sequences. Transmission channel 1265 modulates the pulse sequences with a radio-frequency carrier signal having a base frequency corresponding to the resonance frequency of the nuclear spins in the volume to be imaged.

RF coil 1235 both emits radio-frequency pulses as described above and scans the alternating field which is produced as a result of precessing nuclear spins, i.e. the nuclear spin echo signals. The received signals are received by multiplexer 1262, amplified by RF amplifier 170 and demodulated in receiving channel 1271 of RF system 1255 in a phase-sensitive manner. Analog-digital converters 1272a and 1272b convert the demodulated signals into a real part and an imaginary part.

Computing system 1275 receives the real and imaginary parts and reconstructs an image therefrom according to known techniques. System 1275 may comprise any general-purpose or dedicated computing system. Accordingly, system 1275 includes one or more processing units 1276 (e.g., processors, processor cores, execution threads, etc.) configured to execute processor-executable program code to cause system 1275 to operate as described herein, and storage device 1278 for storing the program code. Storage device 1278 may comprise one or more fixed disks, solid-state random access memory, and/or removable media (e.g., a thumb drive) mounted in a corresponding interface (e.g., a USB port).

Storage device 1278 stores program code of control program 1280. One or more processing units 1276 may execute control program 1280 to cause system 1275 to perform any one or more of the processes described herein. For example, one or more processing units 1276 may execute control program 1280 to cause system 1275 to acquire MR images and operate a network such as network 100 or network 800 to assess the image quality of the acquired MR images. Control program 1280 may also be executable to acquire and/or generate training data, and to train regression, generative and/or discriminative networks as described herein.

One or more processing units 1276 may execute control program 1280 to cause system 1275 to receive the real and imaginary parts of a received RF signal via MR system interface 1282 and reconstruct an image therefrom according to known techniques. Such an image may be stored among acquired images 1285 of storage device 1278.

One or more processing units 1276 may also execute control program 1280 to provide instructions to sequence controller 1250 via MR system interface 1282. For example, sequence controller 1250 may be instructed to initiate a desired pulse sequence. In particular, sequence controller 1250 may be instructed to control the switching of magnetic field gradients via amplifiers 1245a-1245c at appropriate times, the transmission of radio-frequency pulses having a specified phase and amplitude at specified times via RF system 1255 and RF amplifier 1260, and the readout of the resulting magnetic resonance signals.

Acquired images 1285 may be provided to terminal 1290 via terminal interface 1284 of system 1275. Terminal interface 1284 may also receive input from terminal 1290, which may be used to provide commands to control program 1280 in order to control sequence controller 1250 and/or other elements of system 1210. The commands may specify pulse sequence parameter values which are used by system 1275. Terminal 1290 may simply comprise a display device and an input device coupled to system 1275. In some embodiments, terminal 1290 is a separate computing device such as, but not limited to, a desktop computer, a laptop computer, a tablet computer, and a smartphone.

Each element of system 1200 may include other elements which are necessary for the operation thereof, as well as additional elements for providing functions other than those described herein. Storage device 1278 may also store data and other program code for providing additional functionality and/or which are necessary for operation of system 1275, such as device drivers, operating system files, etc.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
a memory storing processor-executable program code; and
a processor to execute the processor-executable program code to cause the system to:
acquire a plurality of motion free reference images;
generate one or more motion-corrupted images by modifying each of the plurality of motion free reference images to include effects of one or more motion types; and
train a regression network to determine a motion score, where training of the regression network comprises:
input of a generated motion-corrupted image to the regression network;
reception of a first motion score output by the regression network in response to the input image; and
determination of a loss by comparison of the first motion score to a target motion score, the target motion score calculated based on the input motion-corrupted image and a reference image that was modified to generate the motion-corrupted image.

2. A system according to claim 1, the processor to further execute the processor-executable program code to cause the system to:
input an image to the trained regression network;
receive a second motion score output by the trained regression network;
compare the second motion score to a threshold motion score; and
determine whether the image is of acceptable quality based on the comparison between the second motion score and the threshold motion score.

3. A system according to claim 2, the processor to further execute the processor-executable program code to cause the system to determine the threshold motion score by:
inputting a plurality of images indicated as acceptable and a plurality of images indicated as unacceptable to the trained regression network;
determining a motion score for each of the plurality of images indicated as acceptable and the plurality of images indicated as unacceptable; and determining the threshold motion score based on the motion scores for each of the plurality of images indicated as acceptable and the motion scores for each of the plurality of images indicated as unacceptable.

4. A system according to claim 2, further comprising:
an imaging system to acquire the image.

5. A system according to claim 1, wherein generation of the one or more motion-corrupted images comprises:
determination of k-space data of a first reference image;
phase-shifting of the k-space data to introduce first motion in the k-space data; and
reconstruction of a first motion-corrupted image from the phase-shifted k-space data.

6. A system according to claim 5, wherein generation of the one or more motion-corrupted images comprises:
phase-shifting of the k-space data to introduce second motion in the k-space data; and
reconstruction of a second motion-corrupted image from the k-space data phase-shifted to introduce second motion.

7. A system according to claim 1, wherein input of a generated motion-corrupted image to the regression network comprises:
segmentation of the input image into two or more segmented images; and
input of the segmented images into the regression network.

8. A computer-implemented method comprising:
generating one or more motion-corrupted images by modifying each of a plurality of reference images to include one or more motion effects previously not exhibited by a respective reference image; and
training a regression network to determine a motion score, where training of the regression network comprises:
inputting of a generated motion-corrupted image to the regression network;
receiving a first motion score output by the regression network in response to the input image; and
determining a loss by comparing the first motion score to a target motion score, the target motion score calculated based on the input motion-corrupted image and a reference image that was modified to generate the motion-corrupted image.

9. A method according to claim 8, further comprising:
inputting an image to the trained regression network;
receiving a second motion score output by the trained regression network;
comparing the second motion score to a threshold motion score; and
determining whether the image is of acceptable quality based on the comparison between the second motion score and the threshold motion score.

10. A method according to claim 9, wherein determining the threshold motion score comprises:
inputting a plurality of images indicated as acceptable and a plurality of images indicated as unacceptable to the trained regression network;
determining a motion score for each of the plurality of images indicated as acceptable and the plurality of images indicated as unacceptable; and
determining the threshold motion score based on the motion scores for each of the plurality of images indicated as acceptable and the motion scores for each of the plurality of images indicated as unacceptable.

11. A method according to claim 8, wherein generating the one or more motion-corrupted images comprises:
determining k-space data of a first reference image;
phase-shifting the k-space data to introduce first motion in the k-space data; and
reconstructing a first motion-corrupted image from the phase-shifted k-space data.

12. A method according to claim 11, wherein generating the one or more motion-corrupted images comprises:
phase-shifting the k-space data to introduce second motion in the k-space data; and
reconstructing a second motion-corrupted image from the k-space data phase-shifted to introduce second motion.

13. A method according to claim 8, wherein inputting a generated motion-corrupted image to the regression network comprises:
segmenting the input image into two or more segmented images; and
inputting the segmented images into the regression network.

14. A system comprising:
a memory storing processor-executable program code; and
a processor to execute the processor-executable program code to cause the system to:
train a generative network to learn a feature distribution of reference images;
input a plurality of acceptable images and a plurality of motion corrupted images to the trained generative network to generate a respective plurality of output images constrained to the feature distribution of acceptable reference images; and
train a discriminator network to discriminate between reference images and unacceptable images based on differences between each of the reference images and the plurality of motion corrupted images and a respective one of the plurality of output images.

15. A system according to claim 14, wherein training of the generative network to learn a feature distribution of reference images comprises:
inputting a first reference image to the generative network;
receiving a first output image from the generative network; and
determining a loss based on a comparison between the first reference image and the first output image.

16. A system according to claim 15, the generative network comprises an encoder-decoder.

17. A system according to claim 14, wherein training of the discriminator network comprises:
inputting a first reference image to the generative network;
receiving a first output image from the generative network;
determining a first residual based on a difference between the first reference image and the first output image;
inputting the first residual to the discriminator network;
receiving a first quality label from the discriminator network; and
determining a first loss based on whether or not the first quality label indicates a a reference image.

18. A system according to claim 17, wherein training of the discriminator network comprises:
inputting a first motion corrupted image to the generative network;
receiving a second output image from the generative network;
determining a second residual based on a difference between the first motion corrupted image and the second output image;

inputting the second residual to the discriminator network;

receiving a second quality label from the discriminator network; and determining a second loss based on whether or not the second quality label indicates a motion corrupted image.

* * * * *